United States Patent
Karve et al.

(10) Patent No.: US 11,182,161 B2
(45) Date of Patent: Nov. 23, 2021

(54) FRACTIONAL OR PARTIAL LINE USAGE PREDICTION IN A PROCESSOR

(71) Applicant: International Business Machines Corporation, Armonk, NY (US)

(72) Inventors: Mohit Karve, Austin, TX (US); Edmund Joseph Gieske, Cedar Park, TX (US); Naga P. Gorti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/849,001

(22) Filed: Apr. 15, 2020

(65) Prior Publication Data

US 2021/0326138 A1   Oct. 21, 2021

(51) Int. Cl.
| | |
|---|---|
| *G06F 12/00* | (2006.01) |
| *G06F 13/00* | (2006.01) |
| *G06F 13/28* | (2006.01) |
| *G06F 9/30* | (2018.01) |
| *G06F 13/16* | (2006.01) |
| *G06F 12/14* | (2006.01) |
| *G06F 12/0802* | (2016.01) |

(52) U.S. Cl.
CPC ...... *G06F 9/30047* (2013.01); *G06F 9/30043* (2013.01); *G06F 12/0802* (2013.01); *G06F 12/1483* (2013.01); *G06F 13/1668* (2013.01)

(58) Field of Classification Search
CPC ............ G06F 9/30047; G06F 9/30043; G06F 12/0802
USPC ....................................................... 711/118
See application file for complete search history.

(56) References Cited

U.S. PATENT DOCUMENTS

| | | |
|---|---|---|
| 6,425,055 B1 | 7/2002 | Sager et al. |
| 6,675,280 B2 | 1/2004 | Cooksey et al. |
| 6,678,795 B1 | 1/2004 | Moreno et al. |
| 2009/0144492 A1* | 6/2009 | Barth ................. G06F 12/0893 711/106 |

(Continued)

OTHER PUBLICATIONS

Varkey, D.A., et al. "RCTP: Region Correlated Temporal Prefetcher", 2017 IEEE 35th International Conference on Computer Design (ICCD), Nov. 2017, 8 pages.

(Continued)

*Primary Examiner* — Edward J Dudek, Jr.
*Assistant Examiner* — Sidney Li
(74) *Attorney, Agent, or Firm* — Scully, Scott, Murphy & Presser, P.C.

(57) ABSTRACT

An information handling system includes a memory subsystem; a processor; and a link connecting the processor and memory subsystem, the processor having a memory controller to manage load instructions; a data cache to hold data for use by the processor; a load store unit to execute load instructions; an instruction fetch unit to fetch load instructions and a cache line utility tracker (CUT) table having a plurality of entries, each entry having a utility field to indicate the portions of a cache line of the load instruction that were used by the processor. The system configured to: determine whether the load instruction is in the CUT Table and in response determine from the CUT Table whether to request a partial cache line; and in response to the data not being in the data cache, transmit a memory request for a partial cache line.

20 Claims, 5 Drawing Sheets

(56) References Cited

U.S. PATENT DOCUMENTS

2009/0198903 A1* 8/2009 Arimilli .............. G06F 12/0862
 711/137
2010/0268884 A1* 10/2010 Cummings ......... G06F 12/0897
 711/122

OTHER PUBLICATIONS

Peled, L., et al. "A neural network memory prefetcher using semantic locality", arXiv:1804.00478v2, Jul. 26, 2018, 13 pages.
Anonymous. "Method and Apparatus for Early Fetch Redirection in a computer processor." IP.com, IPCOM000223643D, Nov. 20, 2012, 6 pages.
Anonymous. "System and Method for Recovering Global Branch Prediction Information Using Address Offset Information." IP.com, IPCOM000216961D, Apr. 25, 2012, 5 pages.

* cited by examiner

FRACTIONAL OR PARTIAL LINE USAGE PREDICTION IN A PROCESSOR

BACKGROUND

Embodiments presented herein are related to handling and processing data and/or improving an information handling or data processing system, and more specifically, to identifying and predicting memory requests that can be satisfied with partial cache lines and fetching by a processor partial cache lines from a memory subsystem.

With advancements in information technology and the wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

The constantly increasing speed of processors which execute increasingly complex applications places more rigorous performance demands on all of the other subsystems in the computer, including the memory subsystem, where data is stored, accessed, and updated numerous times during the operation of a software application. The memory subsystem of most computers is normally operated by a memory controller. The task of memory controllers is to move data between the computer's memory subsystem and its one or more processors as quickly and efficiently as possible. A computer's memory subsystem often comprises main memory includes non-volatile memory devices, for example dynamic random access memory (DRAM) devices, and/or non-volatile memory devices. Computing demands require the ability to access an increasing number of higher density memory devices at faster and faster access speeds.

There are links or buses between the processor (Host) and the memory subsystem that are used to transmit data and control signals between the processor, e.g., the memory controller, and the memory subsystem. Bandwidth limitations on these links can affect performance of the information handling system, processor, and/or the memory subsystems. The amount of data sent over communication links and buses between the Host (processor) and the memory subsystem, impacts performance of information handling systems, processors and/or memory systems. It would be advantageous to implement a system, technique, method, and/or process so that less data is transmitted over the links and buses between the processor and memory subsystem and conserve bandwidth.

SUMMARY

The summary of the disclosure is given to aid understanding of a computer system, its architectural structure and methods of operation; a processor, its architectural structure and methods of operation; and a memory subsystem, its architectural structure and methods of operation, and methods of transmitting data between a processor and a memory subsystem, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system and its architectural structure; a processor and its architectural structure; a memory subsystem and its architectural structure; and their methods of operation to achieve different effects.

Certain aspects of the present disclosure provide a processor, a memory subsystem, an information handling or computer system, and/or a method of processing data. In one or more embodiments, a method of processing data and handling information and/or an information handling system is disclosed that includes: providing a load instruction in a processor; checking a cache line utility tracker (CUT) Table to determine whether the load instruction is in an entry in the CUT Table; in response to the load instruction being in an entry in the CUT Table, determining from the information in the entry in the CUT Table corresponding to the load instruction whether or not to request a partial cache line from a memory subsystem; checking a data cache on the processor to determine whether the data corresponding to the load instruction is in the data cache; in response to determining to request a partial cache line, and further in response to the data corresponding to the load instruction not being in the data cache, transmitting from the processor to the memory subsystem a memory access request that only requests a partial cache line from the memory subsystem; and receiving, in response to the memory access request, the partial cache line into the data cache on the processor over a link between the memory subsystem and the processor. In an aspect, in response to determining to request a partial cache line, the method further includes marking a load instruction with one or more bits as an indicator to request a partial cache line. The method according to an embodiment further includes in response to receiving the partial cache line into the data cache on the processor, sending the partial cache line in the data cache onto a load store unit; and in response to the load instruction completing, updating the CUT table to indicate that the load instruction used only a partial cache line.

The method according to another embodiment includes in response to determining to request an entire cache line, performing at least one of the group consisting of marking a load instruction with one or more bits as an indicator, and entering a default mode, to request an entire cache line. In an aspect, the method includes in response to determining not to request a partial cache line, and further in response to the data corresponding to the load instruction not being in the data cache, transmitting from the processor to the memory subsystem a memory access request that requests an entire cache line from the memory subsystem; and receiving, in response to the memory access request, the entire cache line into the data cache on the processor over a link between the memory subsystem and the processor. The method can also include receiving the entire cache line into the data cache on the processor, sending the entire cache line onto a load store unit; and in response to the load instruction completing, updating the CUT table to indicate that the load instruction used an entire cache line. In a further aspect the method can include in response to the data corresponding to the load instruction being in the data cache, sending the data corresponding to the load instruction to a load store unit; and in response to the load instruction completing, updating the CUT Table to indicate the one or more portions of the cache line that were utilized. In one or more embodiments, wherein determining from the information in the entry in the CUT Table corresponding to the load instruction whether or not to request a partial cache line from the memory subsystem includes reading a utility field from the CUT Table to determine whether at least one of the group consisting of an entire cache line, nearly an entire cache line, and a portion of a cache line was used previously by the load instruction. In response to the load instruction not being in the CUT Table, and further in response to the data corresponding to the load instruction not being in the data cache, the method in an aspect includes transmitting by the processor to the memory subsystem a memory access request that requests an entire cache line from the memory subsystem. In a further aspect, the method optionally includes in response to (a) the load instruction not being in the CUT Table, (b) the data corresponding to the load instruction not being in the data cache, and (c) requesting an entire cache line from the memory subsystem, receiving, in response to the memory access request, the entire cache line into the data cache on the processor; sending the entire cache line from the data cache to a load store unit; and in response to the load instruction completing, updating the CUT table to indicate the one or more portions of the cache line used by the processor.

In one or more embodiments, an information handling system is disclosed that includes a memory subsystem; a processor; and a link connecting the processor and memory subsystem, the processor having a memory controller having circuitry and logic to manage load instructions; a data cache having circuitry and logic to hold data for use by the processor; a load store unit having circuitry and logic to execute load instructions; an instruction fetch unit having circuitry and logic to fetch instructions for the processor, including load instructions; and a cache line utility tracker (CUT) table having circuitry and logic, the CUT Table having a plurality of entries, each entry having a tag field to identify a load instruction and a utility field to indicate the portions of a cache line of the load instruction that were used by the processor. The system in one or more aspects is configured to: check the CUT Table to determine whether the load instruction is in an entry in the CUT Table; in response to the load instruction being in an entry in the CUT Table, determine from the information in the entry in the CUT Table corresponding to the load instruction whether or not to request a partial cache line from the memory subsystem; check the data cache on the processor to determine whether the data corresponding to a load instruction being processed by the processor is in the data cache; in response to determining to request a partial cache line, and further in response to the data corresponding to the load instruction not being in the data cache, transmit from the processor to the memory subsystem a memory access request that only requests a partial cache line from the memory subsystem; and receive, in response to the memory access request, the partial cache line into the data cache on the processor over the link between the memory subsystem and the processor. The system is optionally further configured to in response to receiving the partial cache line into the data cache on the processor, send the partial cache line in the data cache onto the load store unit; and in response to the load instruction completing, update the CUT table to indicate that the load instruction used only a partial cache line. In an aspect the system is further configured to in response to determining to request a partial cache line, mark a load instruction with one or more bits as an indicator to request a partial cache line.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of the information handling system, computer system, computer architectural structure, processor, memory subsystem, and their methods of operation will be better understood when read in conjunction with the figures provided. Embodiments are provided in the figures for the purpose of illustrating aspects, features, and/or various embodiments of the computer system, computer architectural structure, processor, memory subsystem, and their methods of operation, but the claims should not be limited to the precise arrangement, structures, subassemblies, circuitry, modules, units, features, aspects, methods, processes, embodiments, or devices shown, and the arrangements, structures, subassemblies, circuitry, modules, units, features, aspects, methods, processes, embodiments, and devices shown may be used singularly or in combination with other arrangements, structures, subassemblies, circuitry, modules, units, features, aspects, methods, processes, embodiments, and devices.

DETAILED DESCRIPTION

Figure 1:
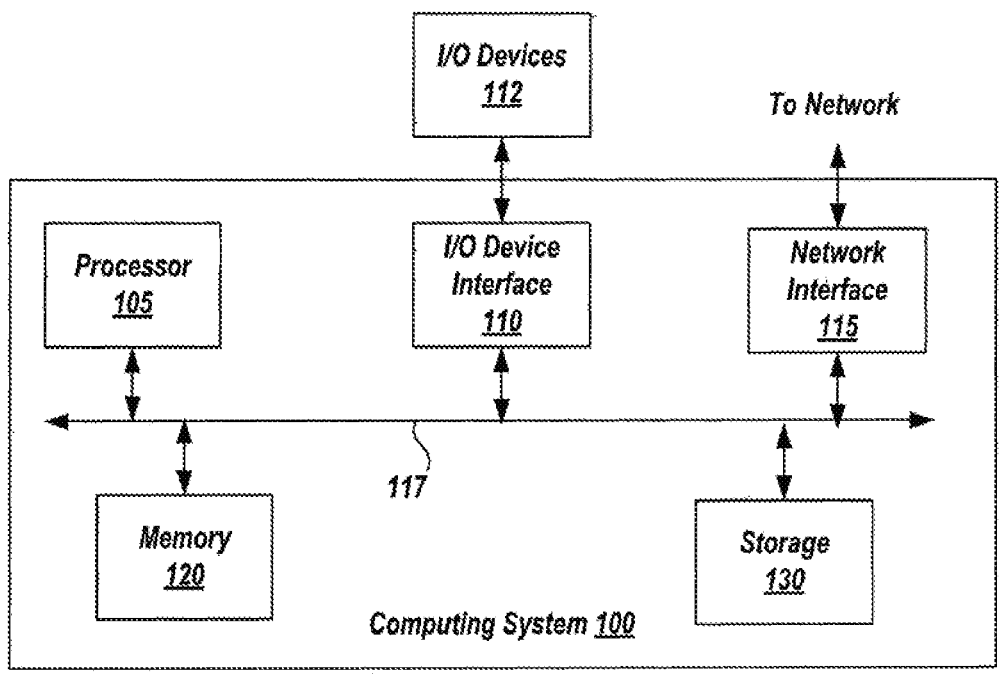
FIG. 1 illustrates an example computing or data processing system, according to one or more embodiments of the present disclosure.

The following description is made for illustrating the general principles of the invention and is not meant to limit the inventive concepts claimed herein. In the following detailed description, numerous details are set forth in order to provide an understanding of information handling systems, computer systems, computer architectural structures, processors, memory subsystems, and their methods of operation, however, it will be understood by those skilled in the art that different and numerous embodiments of the computer systems, computer architectural structures, processors, memory subsystems, and their methods of operation may be practiced without those specific details, and the claims and invention should not be limited to the arrangements, structures, subassemblies, circuitry, modules, units, features, aspects, processes, methods, embodiments, devices, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems, their architecture and method of operation; and memory subsystems, their architecture, and method of operation, which are apparent to those skilled in the art. It is assumed that those skilled in the art are familiar with the general architecture and operation of information handling systems; the general architecture and operation of processors, and in particular with processors which operate in an out-of-order execution fashion, including multi-slice processors; and the general architecture and operation of memory subsystems; including the fetching and transfer data between processors and memory subsystems. It may be noted that a numbered element is numbered according to the figure in which the element is introduced, and is typically referred to by that number in succeeding figures.

Embodiments presented herein disclose system and techniques for improving processor efficiency, processor power consumption and bandwidth between a processor and memory subsystems. The system and method in one or more embodiments utilizes partial or fractional memory accesses to improve bandwidth between a processor and a memory subsystem, for example main memory. The bandwidth savings has a two-fold effect as performance of the system increases due to the appearance of increased bandwidth between the processor and memory subsystem, also referred to as memory bandwidth, and power consumption is reduced as data is not needlessly transferred between the processor (processor core) and the memory subsystem, e.g., main memory.

In one or more embodiments, a new mechanism and system for predicting which memory accesses will be satisfied by partial or fractional memory subsystem accesses is disclosed. In one or more embodiments, a predictor that tracks historical usage of data caches lines per load instruction is introduced. On future instances of a given load instruction, the predictor is used to predict which accesses from the memory subsystem will be satisfied with only chunks or a portion of the cache line, and in an aspect to request and/or fetch only chunks or a portion of the cache line from the memory subsystem. In an aspect, a new table, preferably is added to the Instruction Fetch Unit (IFU) in the processor core, to track the consumption of the current cache line being used by a load instruction. If the cache line is only partially used, that load instruction is marked with one or more bits in the table to inform the memory controller that only a portion of that cache line is required, so that in the future the memory controller will not request the whole cache line, e.g., will request only a portion of the cache line, from the memory subsystem for that load instruction. Requesting and/or fetching only a portion of the cache line from the memory subsystem, e.g., main memory, will save memory bandwidth with its attendant power saving and efficiency benefits.

Turning to the environments in which the system, product, methods, techniques, and programming instructions have potential application, FIG. 1 illustrates an example computing system 100 configured with a processor 105 and memory subsystem 120, according to an embodiment. As shown, the computing system 100 includes processor 105, network interface 115, memory 120, and storage 130, each connected to bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, tablet, server, etc. Of course, the computing system 100 will include a variety of additional hardware components.

The processor 105 retrieves and executes programming instructions and data stored in memory 120, e.g., main memory 120, as well as stores and retrieves application data residing in more remote storage 130. The bus 117 is used to transmit instructions and data between the processor 105, I/O device interface 110, network interface 115, memory 120, and storage 130. Memory 120 is generally included to be representative of a memory subsystem (e.g., main memory) and can include caches, interconnects, and random access memory (RAM), e.g., dynamic random access memory (DRAM). Memory 120 stores program instructions and operand data used by the processor 105. Storage 130 may be a combination of fixed and/or removable storage devices, such as fixed disc drives, removable memory cards, or optical storage, network attached storage (NAS), or a storage-area network (SAN).

Figure 2:
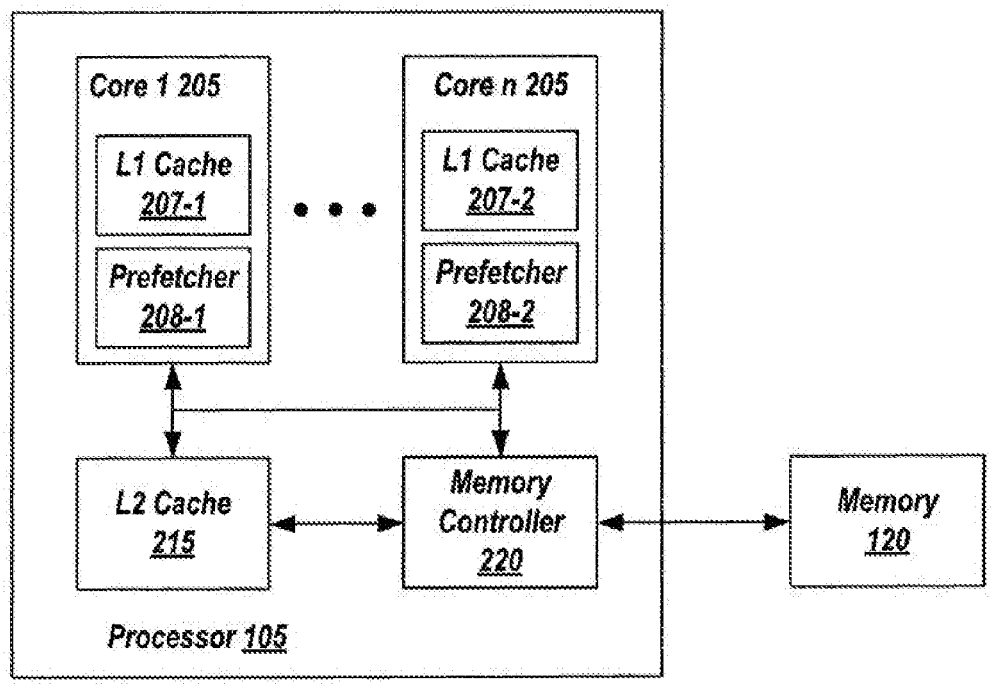
FIG. 2 further illustrates the processor described relative to FIG. 1, according to one or more embodiments.

FIG. 2 further illustrates the processor 105 configured to benefit from identifying or predicting, and implementing, memory requests that will be satisfied by partial cache lines, according to an embodiment. As shown, the processor 105 includes one or more cores, from core 1 205 to core n 205, a Level 2 (L2) cache 215, and a memory controller 220. As shown, the cores 205 each include a Level 1 (L1) cache 207, and a prefetcher 208. The processor 105 most likely includes a variety of additional components. The processor core 205 including the L1 cache 207 and the prefetcher 208, the memory controller 220, and the L2 cache 215 each contain circuits and logic to perform their respective functions.

The L1 cache 207 and/or the L2 cache 215 are processor hardware caches used by the processor to reduce the time to access data from main memory. A cache is a smaller usually faster memory, located closer to a processor core, which stores copies of the data from frequently used main memory locations. The L1 caches 207 and L2 cache 215 may include separate instruction and data caches implemented using high speed memory devices. The caches 207 and 215 may temporarily store values that might be repeatedly accessed by the processor 105 to more quickly process data, e.g., by avoiding loading values directly from the memory 120. Additional cache levels (e.g., a Level 3 (L3) cache) may be provided. Each cache level from highest (L1) to lowest (L3) may successively store more information, but with a longer access penalty. Each cache includes a number of memory blocks that individually store various instructions and data values. Data is transferred between memory 120 and data cache typically in blocks of fixed size called cache lines (CLs) or cache blocks. When a cache line (CL) is coped from memory into cache on a processor, a cache entry is created. The cache entry can include a variety of fields, and typically for data cache will include the data in a data field, and the requested address or location in main memory in an address field.

When the processor needs to read or write a location in memory, the cache is first checked for a corresponding or matching entry. The cache checks for the contents of the requested memory location in any cache lines in the cache that might contain that address/location. If the processor determines that the memory location is in the cache, a cache hit occurs and the processor reads or writes the data in the cache line. If, however, the processor does not find the memory location in the cache, a cache miss occurs, the cache in an embodiment allocates a new cache entry, data from main memory is copied into the new cache entry, and the memory request is fulfilled from the contents of the cache entry.

The prefetcher 208 prefetches data from main memory into the data caches. To do so, the prefetcher 208 may include logic that detects monotonically increasing or decreasing sequences of demand accesses to cache lines having common address spacing. The prefetcher 208 identifies and prefetches data access patterns of the memory 120. The prefetcher 208 in an embodiment manages a cache structure for prefetch streams, e.g., on the L1 cache 207, and in an aspect predicts which of the data streams will be required by the processor 105. The memory controller 220 in an embodiment is configured to receive prefetch requests from prefetcher 208.

Figures 3, 4:
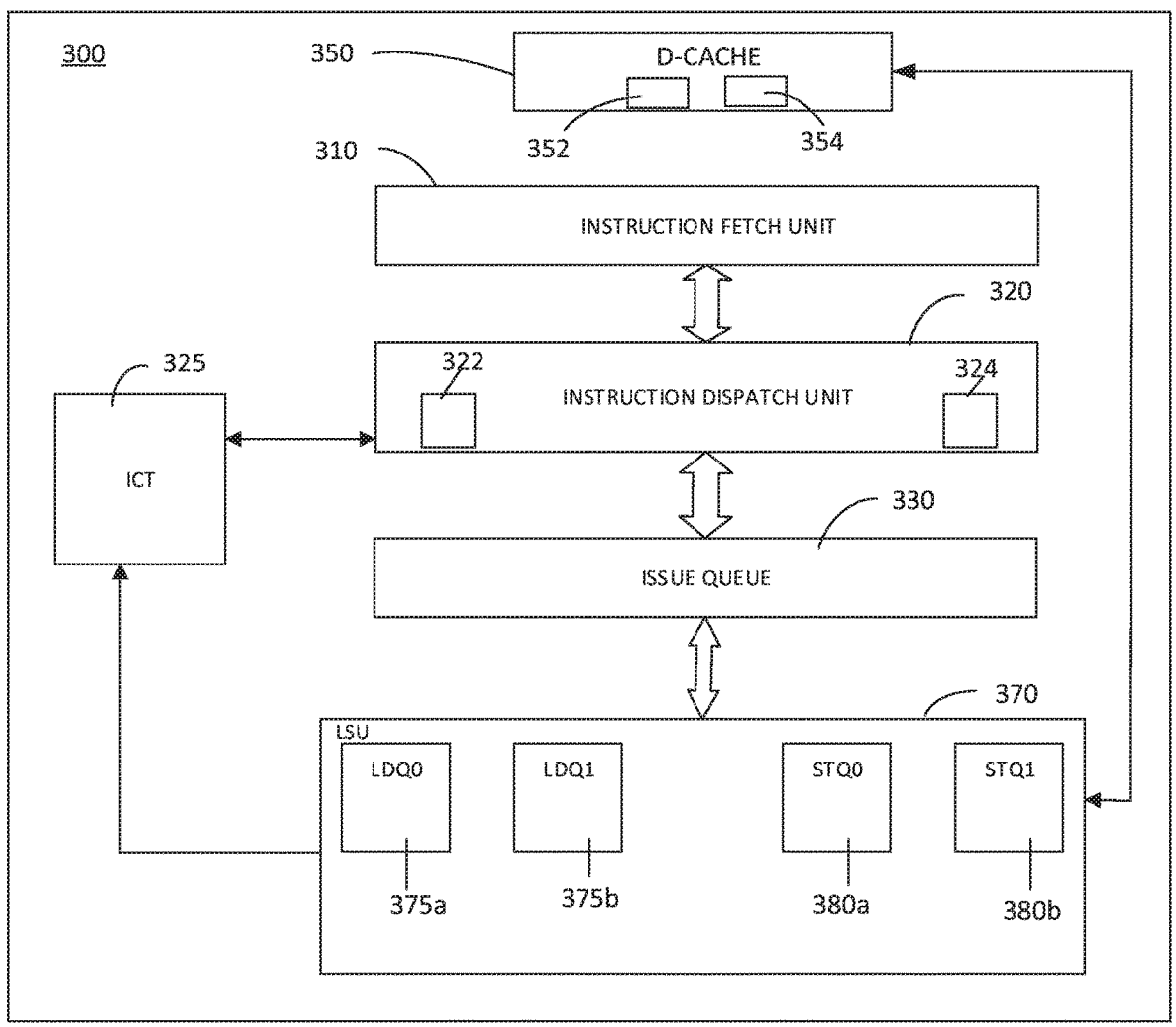
FIG. 3 illustrates portions of a processor core in which certain aspects of the present disclosure may be practiced.
FIG. 4 illustrates a table for tracking the portions or chunks of a cache line utilized by a processor.

FIG. 3 illustrates a portion of a processor pipeline, according to an embodiment of the disclosure. It should be noted that FIG. 3 only shows portions of processor 300 in diagrammatic fashion for purposes of discussion. Processor pipeline 300 in FIG. 3 includes Instruction Fetch Unit (IFU) 310, Instruction Dispatch Unit 320, Issue Queue (ISQ) 330, Instruction Completion Table (ICT) 325, Data Cache 350, and Load Store Unit (LSU) 370. The LSU 370 includes one or more load queues (LDQ) 375 that hold load instructions, and one or more store queues (STQ) 380 that hold store instructions. The processor core may include other circuits, functional units, and components.

The Instruction Fetch Unit (IFU) 310 fetches instructions and the Instruction Dispatch Unit 320 dispatches instructions to the Issue Queue (ISQ) 330, typically in program order. The IFU 310, the Dispatch Unit 320, and the ISQ 330 each have circuitry and logic to perform their respective functions. The Issue Queue (ISQ) 330 will issue load and store instructions to the LSU 370, and more particularly will issue load instructions to the load queue (LDQ) 375 and store instructions to the store queue (STQ) 380 in the LSU 370. The LSU 370 has circuitry and logic to perform its functions. The ISQ 330 typically holds an instruction until data associated with the instruction has been retrieved and is ready for use. For example, when data has been retrieved and placed in data cache 350, e.g., L1 cache 352 or L2 cache 354, associated with the processor 300. When data is not ready, e.g., not within the appropriate data cache, delay can result as the ISQ 330 will not issue the instruction to the execution unit. For at least this reason, the Issue Queue (ISQ) typically issues instructions, e.g., load and store instructions, to the execution units, e.g., LSU 370, out of order so instructions where the required data is available can be executed.

Instructions to load data from main memory to cache on the processor, e.g., load instructions (ITags), target specific locations in main memory. Some load instructions (ITags) have a pattern that requires the entire cache line (ECL) to be copied from main memory to the data cache, while other load instructions only use a small portion of a cache line copied from main memory. Cache line sizes copied from main memory are typically fixed and generally range from about 64 to 128 Bytes. If only a portion of a cache line is being used, e.g., 4-32 Bytes, it can be advantageous to only request, fetch, and/or transmit portions of a cache line, e.g., a partial or fractional cache line (PCL), from a memory subsystem to a processor. For example, bandwidth consumption between a processor and main memory (memory bandwidth) can be improved as unneeded data is not fetched from main memory and transmitted to the processor. In addition, as less data is requested and/or transferred between the processor and the memory subsystem, potentially less power will be used by the system.

This disclosure proposes a system, product, programming instructions, technique, and/or method to predict which memory requests, e.g., load instructions (ITags) will be satisfied by partial or fractional cache lines (PCLs), e.g., less than a full or entire cache line. A predictor in one or more embodiments is used to track historical usage of data cache lines per load instruction (ITag). If a given load instruction (ITag) uses only a portion of the cache line (CL), the predictor is used for future instances of the given load instruction (ITag) to fetch only chunks or a portion of the cache line, e.g., a partial cache line (PCL), preferably containing the required data (e.g., the specified memory location). In one or more embodiments, the predictor takes the form of a table that tracks the consumption of the current cache line (CL) being used by a given load instruction (ITag). If the cache line is only partially used, that load instruction (ITag) is marked with one or more bits to inform the memory controller that only a part of that cache line (PCL) is required, so that the memory controller when processing that load instruction (ITag) in the future preferably will not request the whole or entire cache line (ECL), but rather only a fractional part of the cache line (PCL). The new table will have multiple entries and will be indexed by the address of the load instruction (ITag). The table will have a tag field used to identify a specific load instruction and identified by a Tag (iTag or ITag), and the new table will have a utility field, that is N bits wide, where in an aspect each bit in the utility field represents one or more bytes or chunks of a data cache line.

FIG. 4 represents an example of the new table, referred to as Cache Line Utility Tracker (CUT) Table 415, having a plurality of entries 414. While only a couple of entries 414 are shown in FIG. 4 it will be appreciated that Cache Line Utility Tracker (CUT) Table 415 will have numerous entries 414. Each entry 414 includes a tag field 416 used to identify a specific load instruction, and a utility field 418 that represents the chunks or portions of a data cache line that is/was used, needed, or required by the specific load instruction. The CUT Table 415 is indexed by the address of the load instruction (ITag). In the example of FIG. 4, the tag field 416 is 10-20 bits, and the utility field 418 is 8 bits where each bit represents 16 Bytes of a 128 Byte cache line. Accordingly, as shown in FIG. 4, the first bit in utility field 418 represents Bytes 0-15 of the data cache line, the second bit represents Bytes 16-31 of the data cache line, etc., until the eighth bit represents Bytes 112-127 of the data cache line. It will be appreciated that the utility field 418 can be different sizes and each bit can represent more or less chunks of the data cache line. For example, for a processor that uses 128 Byte cache lines, the utility field could be 16 bits wide, where each bit represents 8 Bytes of data.

In operation, as load instructions (ITags) complete, e.g., retire, the tag field 416 in the CUT Table 415 is updated with the load instruction, i.e., the ITag, and the utility field 418 is set with the appropriate bits for all the chunks of memory in that cache line (CL) that were used. If a load instruction (ITag) uses all of (or most of) a given data cache line before advancing to the next cache line, the system uses that information from the CUT Table 415 to predict that for future instances of that load instruction (ITag), the full or entire cache line (ECL) for that load instruction (ITag) should be fetched. If on the other hand only a portion or fraction of the data cache line (PCL) is used for a given load instruction (ITag), say for example all accesses occur in the same 16 Bytes or 32 Bytes of the data cache line, than future instances of that load instruction (ITag) can be marked with one or more bits, for example a portion bit or a fractional line request bit, which informs the memory controller to only request partial data from the data cache line, e.g., request a partial cache line (PCL). In an example, the memory controller can request the region or portion of the data cache line that includes the exact address of the load instruction (ITag).

If when fetching only a partial data cache line (PCL), a miss is suffered on the remaining portion of the cache line, the memory controller in an embodiment requests the full or entire data cache line (ECL). In an aspect, the CUT table continues to gather utilization information when different instances of the load instruction complete or retire. The entry in the CUT Table 415 pertaining to that load instruction (ITag), the Tag field 416 and the corresponding bits in the utility field 418, can be updated to indicate which portions of the data cache line were used. Even though the prediction for the current cache line was erroneous, the CUT entry continues to be updated to provide better predictions in the future. This approach provides a sophisticated system and method of marking some load instructions (ITag) as fractional data cache line requests and others as full data cache line requests even in the same region of instruction memory. Accordingly, even in hybrid data access patterns, for example, when a program is simultaneously operating on sparse structures (fractional cache line (PCL) accesses) and contiguous array structures (full cache line (ECL) accesses), the processor will be able to correctly identify each type of access pattern without wasting bandwidth on transferring unwanted data between the processor cache and the memory subsystem.

Figure 5:
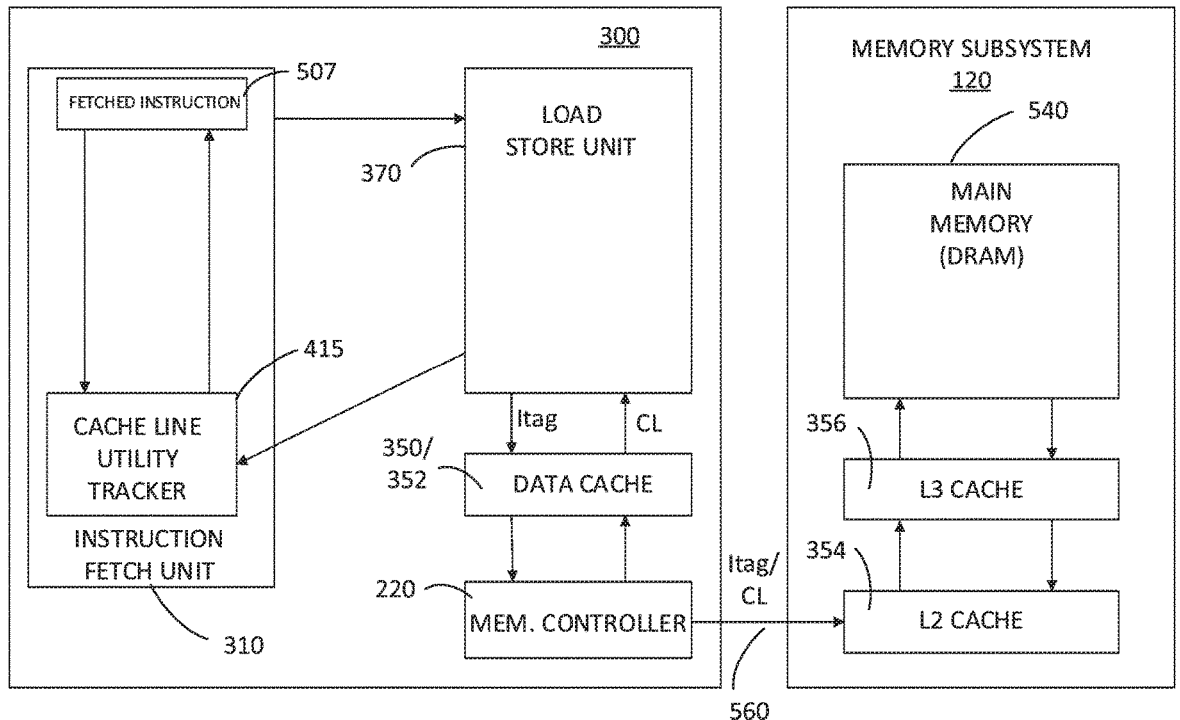
FIG. 5 illustrates portions of a data processing system including aspects of a processor and memory subsystem in which certain aspects of the present disclosure may be practiced.
Figure 6:
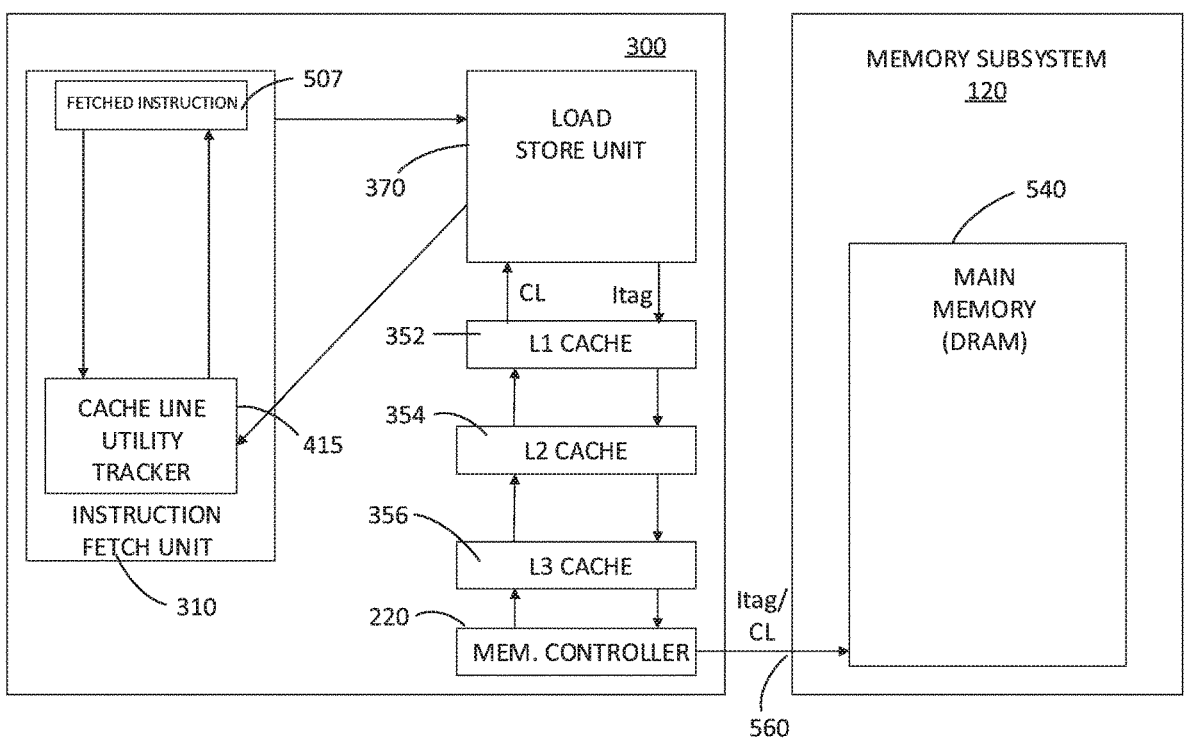
FIG. 6 illustrates portions of a data processing system including aspects of a processor and memory subsystem in which certain aspects of the present disclosure may be practiced.

FIGS. 5-6 illustrates a portion of an information handling system having a processor 300, memory subsystem 120, and a memory communications link 560 between the processor and memory subsystem for transmitting instructions and data between the processor 300 and memory subsystem 120. Each processor 300 in FIGS. 5-6 has an Instruction Fetch Unit (IFU) 310 having a Cache Line Utility Tracker (CUT) Table 415, a Load Store Unit (LSU) 370 and a memory controller 220. The IFU 310 fetches instructions 507 from for example the instruction cache (not shown in FIGS. 5-6), the LSU 370 executes load and store instructions, and memory controller 220 handles, processes, manages, and transmits memory access requests, e.g., load instructions (ITags), over communications link 560 to memory subsystem 120. The CUT Table 415 is checked to determine whether the next fetched instruction 507 is in the CUT Table 415. If the next instruction 507 is in the CUT Table 415, in an embodiment the load instruction (ITag) is annotated with information from the CUT Table 415 and sent to the LSU. Each of IFU 310, Cut Table 415, LSU 370, and memory controller 220 contain circuitry and logic to perform their respective functions. Each memory subsystem 120 has main memory 540 that typically includes DRAM, however, other types of volatile and non-volatile memory can be used in main memory 540. Each memory subsystem 120, and main memory 540, contains circuitry and logic to perform their respective functions.

In both FIGS. 5 and 6, memory requests (load instructions (ITags)) are transmitted from the processor 300, more specifically the memory controller 220, to the memory subsystem 120 over link 560, and data, i.e., cache lines (CLs), is transmitted from the memory subsystem 120 to the processor 300 over link 560. It can be appreciated that link 560 can constitute one or more links, including a link to handle and transmit memory requests, e.g., load instructions (ITags), from the processor to the memory subsystem, and another link to handle and transmit the data, e.g., the cache line (CL), constituting the memory response from the memory subsystem to the processor. FIG. 5 has different levels of cache on the processor core 300 than does FIG. 6. In FIG. 5 the processor 300 has a single data cache 350, also referred to as L1 Cache 352. The instruction flow, e.g., load instruction (ITag) flow, in FIG. 5 is from the LSU 370 to data cache 350 (L1 cache 352) to the memory controller 220 on processor 300. The load instruction (ITag) is communicated over the link 560 to the memory subsystem 120 where it flows to the L2 Cache 354, to the L3 Cache 356 to main memory 540. The data, i.e., the cache line (CL), fetched from memory subsystem 120 flows in the opposite direction in FIG. 5 from main memory 540, to L3 Cache 356, to L2 Cache 354, over the link 560 between memory subsystem 120 to the memory controller 220 in processor 300, and from the memory controller 220 to data cache 350 (L1 Cache 352) to the LSU 370.

The instruction flow, e.g., load instruction (ITag) flow, in FIG. 6 is from the LSU 370 to L1 cache 352, to L2 Cache 354, to L3 Cache 356 to the memory controller 220 on processor 300. The load instruction (ITag) is communicated over the link 560 to the memory subsystem 120 where it flows to main memory 540. The data, i.e., the cache line (CL), fetched from main memory 560 in memory subsystem 120 in FIG. 6 flows from main memory 540 over link 560 to the memory controller 220 in processor 300, and from the memory controller 220 in the processor 300 to L3 Cache 356, to L2 Cache 354, to L1 Cache 352, and to the LSU 370. The data cache 350, L1 Cache 352, L2 Cache 354, L3 Cache 356 and Main Memory 540, all contain circuitry and logic to perform their respective functions.

An example of how the Cache Line Utility Tracker (CUT) Table 415 in FIGS. 5-6 is used to process data in an information handling system will be described. For example, a fetched load instruction 507 requests 8 Bytes of data each at the following four addresses:

0x100 8 Bytes

0x108 8 Bytes

0x110 8 Bytes

0x118 8 Bytes

The processor 300 processes the instruction. In an embodiment, as the load instruction (ITag) completes and/or retires, the CUT Table 415 as illustrated in Table 1 below is updated where the tag field 416 is updated with the load instruction tag (ITag), and the utility field 418 is updated to indicate how many Byte chunks or portions were used, needed, and/or required and correspond to that load instruction (ITag).

TABLE 1

Cache Line Utility (CUT) Table 415:

| Tag (10-20 bits) | 0-15 (1 bit) | 16-31 (1 bit) | 32-47 (1 bit) | 48-63 (1 bit) | 64-79 (1 bit) | 80-95 (1 bit) | 96-111 (1 bit) | 112-127 (1 bit) |
|---|---|---|---|---|---|---|---|---|
| Tag bits | 1 | 1 | 0 | 0 | 0 | 0 | 0 | 0 |

As load instructions (ITags) are completed and/or retire, the CUT table 415 is populated and updated with information on how much of the cache line (CL) fetched from memory subsystem 120 is utilized by the processor 300. The CUT Table 415 is used to determine and/or predict which load instructions (ITags) likely will not use the entire cache line fetched from memory and thus where it might be advantageous to fetch only a partial cache line (PCL) from memory 120. When an instruction 507, more specifically a load instruction (ITag), is fetched and/or received by the Instruction Fetch Unit (IFU) 310 in processor 300, the CUT Table 415, preferably residing in the IFU 310, is checked to determine whether or not the load instruction (ITag) 507 being processed by the processor resides in the CUT Table 415. If the load instruction (ITag) 507 resides in the CUT Table 415, e.g., there is a hit (matching entry) in the CUT Table 415, then the bits in the utility field 418 are reviewed (read) to determine in one or more embodiments whether or not the load instruction (ITag) 507 in the past used the entire cache line (ECL) or only portions of the cache line (PCL).

If in the past the load instruction (ITag) 507 used the entire cache line (ECL), or nearly the entire cache line, as indicated by the CUT Table 415, then the IFU 310 in an embodiment indicates to the LSU 370 and/or the memory controller 220 that the entire cache line (ECL) should be requested and retrieved from memory 120. If in the past the load instruction 507 used only a portion of the cache line (PCL) as indicated by the utility field bits in the CUT Table 415, then the IFU 310 in an embodiment indicates to the LSU 370 and/or the memory controller 220 to request and fetch only a portion of the cache line (PCL) from memory 220. It can be appreciated, that the portion or amount of the cache line to request and fetch from memory 120 can be varied. For example, the amount of cache line to request and fetch from memory 120 can be varied depending upon the amount of data previously used by the memory request, e.g., load instruction (ITag) 507, as determined by the bits in the utility field 418 in the CUT Table 415. So for example, if the load instruction (ITag) 507 in the example of Table 1 is processed in the future, and the load instruction (ITag) 507 misses in the data cache, then the CUT Table 415 would be used to request only 32 Bytes of data instead of the full 128 Byte line.

In one or more embodiments, the next fetched instruction 507 is checked whether or not it is in the CUT Table 415, and in an aspect, if the fetched load instruction 507 is in the CUT Table 415, the entry in the CUT Table 415 is read to determine whether or not a partial of fractional cache line (PCL) should be requested. If the entry in the CUT Table corresponding to the load instruction indicates that a partial or fractional cache line (PCL) should be requested in the case of a cache miss, a cache line indicator field is marked in the load instruction. The IFU 310 sends the load instruction (ITag) to the LSU 370 with the cache line indicator field marked to indicate to request a partial cache line (PCL). In an embodiment, the data cache is checked to determine whether or not the data is in the data cache. If the load instruction 507 misses in the data cache 350 (L1 Cache 352) in FIG. 5 or the L1 Cache 352, the L2 Cache 354, and the L3 Cache 356 in FIG. 6, then the information in the cache line indicator field is used to request either the entire cache line (ECL) or a partial cache line (PCL).

Figure 7:
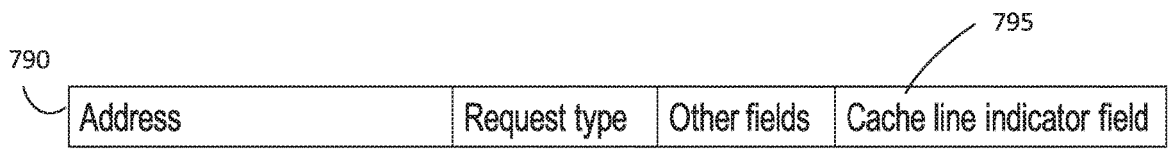
FIG. 7 illustrates a load instruction with a cache line indicator field used to indicate whether a processor should request and/or fetch an entire cache line or a partial cache line.

In an example, the load instruction (ITag), includes a cache line utility field 795 that can indicate whether a full or entire cache line (ECL), or a partial or fractional cache line (PCL) should be requested and fetched from memory. A diagrammatic example of the fields in a load instruction 790 is shown in FIG. 7 with a cache line indicator field 795. The cache line indicator field 795 can be marked with one or more bits to indicate whether a full cache line (ECL) or a partial cache line (PCL) should be requested and fetched from memory. In an embodiment, the cache line indicator field 795 can be marked with zeros to indicate that a full or entire cache line (ECL) should be requested and fetched from memory, and in an aspect the cache line indicator field 795 can be marked with zeros by default. In an aspect, the cache line indicator field 795 can be a single bit and marked with a one to indicate a partial or fractional cache line (PCL) should be requested and fetched from memory. In an embodiment, the cache line indicator field 795 in the load instruction (ITag) can be a plurality of bits, and marking different bits with a one can indicate different size cache lines and which portions of the cache line to request and fetch from memory.

In one implementation, the CUT Table 415 provides a precise prediction of exactly which chunks of the data cache line (CL) are expected to be consumed, so if the utility field 418 is 00111100, than that partial utility vector is sent to the memory controller 220, e.g., the load instruction cache line indicator field 795 in the load instruction 790 is marked with that information, and the middle 64 bytes of the cache line are requested and fetched from memory subsystem 120. In another implementation, the processor can be configured to only send an entire cache line (ECL), or a first half or a second half (64 bytes of a 128 byte cache line) of a partial cache line (PCL) and if the utility field 418 in the CUT Table 415 indicates that only a partial cache line (PCL) memory access request will suffice, then the memory controller 220 will provide a partial cache line memory request. So for example, if the utility field 418 has a utility field vector of 00111100, and the load instruction 790 specifically targets the third set of 16 bytes, then the cache line indicator field 795 in the load instruction 790 is set with a bit to indicate a partial cache line (PCL) memory request, and the memory controller 220 would request and fetch the first 64 bytes of the cache line, e.g., vector 11110000 of the cache line, that would include the third set of 16 bytes of data in the cache line. Accordingly, it can be appreciated that the cache line indicator field 795 in load instruction 790 can be one or more bits depending upon the design of the processor, and/or the memory subsystem.

While the above embodiments contemplate checking the CUT Table 415 before checking the data cache for the data required by the load instruction, it can be appreciated that the data cache can be checked before the CUT Table is checked to determine whether to request a partial or entire cache line. In this regard, after there is a miss in the data cache 350 (or L1 Cache 352, L2 Cache 354, or L3 Cache 356), the CUT Table 415 can be checked, and if there is a hit in the CUT Table 415 that information can be utilized to request a partial cache line (PCL).

In one or more embodiments, if only a fractional or partial cache line (PCL) of data is requested and fetched from memory and loaded in the data cache, and the load instruction (ITag) still misses in the data cache, then the processor 300 (memory controller 220) in an embodiment requests and fetches the entire cache line (ECL) which is uploaded into the data cache. In an aspect, as the load instruction (ITag) completes and/or retires, the CUT table 415 is updated, and in particular the utility field 418 is updated to mark all the bits to indicate that the corresponding load instruction (ITag) utilized the entire cache line (ECL). If the load instruction (ITag) misses in the CUT Table 415, then in an embodiment the system, e.g., the memory controller 220 requests the entire cache line (ECL), and in an aspect, the system can default to requesting and/or fetching the entire cache line (ECL).

Figure 8B:
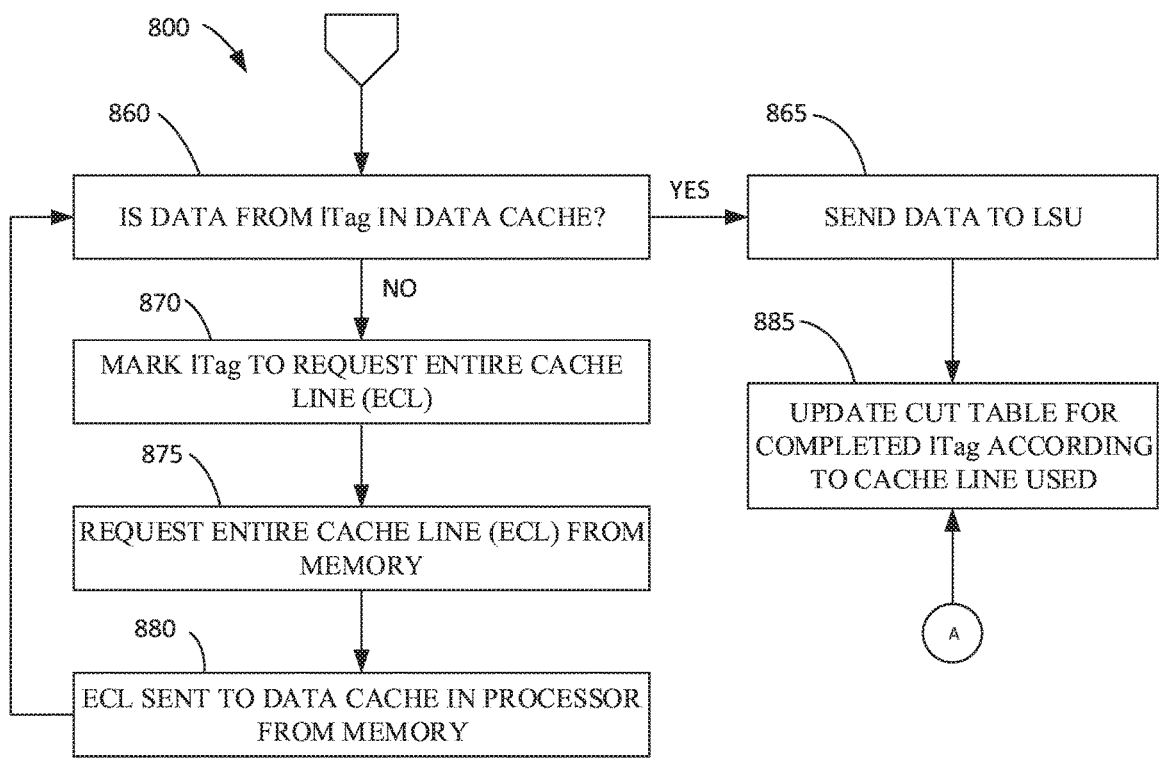
FIG. 8A and FIG. 8B illustrates a flow diagram for a method for requesting and fetching data for an execution unit in a processor, including in an embodiment, predicting, requesting, fetching, and transmitting a partial or fractional cache line from memory to a data cache in a processor.
Figure 8A:
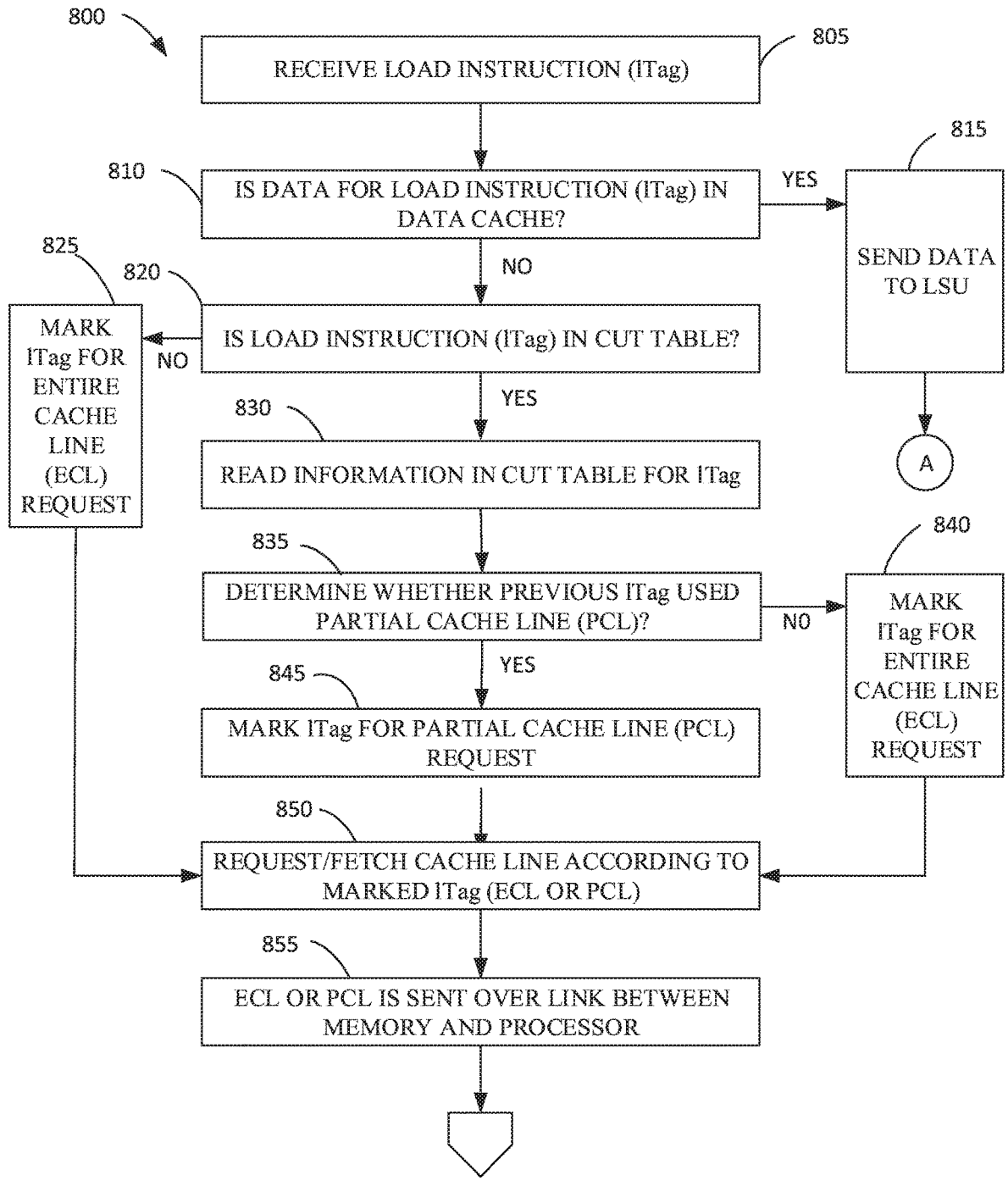

FIGS. 8A & 8B is an exemplary flowchart in accordance with one embodiment illustrating and describing a process, technique, or method 800 of handling instructions in an information handling system, and more specifically a method of predicting whether to request a full or entire cache line (ECL) memory access or a partial cache line (PCL) memory access, and requesting and/or fetching partial or fractional cache lines (PCLs) from memory. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 8A & 8B, but the process may be integrated and/or one or more steps may be performed together, simultaneously, or the steps may be performed in the order disclosed or in an alternate order.

Method 800 in one or more embodiments includes at 805 receiving a load instruction (ITag) in an embodiment by an Instruction Fetch Unit (IFU). At 810, in an embodiment, the data cache is checked and it is determined whether or not the data pertaining to the load instruction (ITag) resides in the data cache, i.e., the data cache is checked to see if there is a hit (a matching entry). If there is a matching entry in the data cache (810: Yes), then at 815 the data from the data cache is sent to a Load Store Unit (LSU), e.g., LSU 370. It can be appreciated that the data cache is on the processor 300 and can include more than one level of cache, for example L1 Cache, L2 cache, and/or L3 cache. After 815 the process or method 800 continues to 885 described below. If there is no matching entry in the data cache (810: No), then at 820 a Cache Line Utility Tracker (CUT) Table is checked to determine whether or not the load instruction (ITag) resides in the CUT Table. If the load instruction (ITag) does not reside in the CUT Table (820: No), then at 825 the load instruction (ITag) in an embodiment is marked to indicate to request the entire cache line (ECL). The load instruction (ITag) in an aspect can by default be for the entire cache line (ECL). After 825, the method 800 continues to 850 described below.

If the load instruction (ITag) does reside in the CUT Table (820: Yes), then at 830, the information in the Utility Field of the CUT Table is read and processed. That is, for example, the bits in the Utility Field of the CUT Table are read and processed. At 835, it is determined whether the load instruction (ITag) being processed previously used, required, and/or needed an entire cache line (ECL), a partial cache line (PCL), and/or how much of the cache line previously was used by the processor. Whether the entire cache line (ECL) or a portion (and what portion) of the cache line (PCL) was previously used is determined in an aspect by reading and processing the bits marked in the Utility Field in the CUT Table. If it is determined that the load instruction (ITag) previously did not use a partial cache line, e.g., an entire cache line or nearly entire cache line was used (835: No), then, at 840, the cache line indicator field 795 in the load instruction (ITag) 790 is set or marked, for example with one or more zeros, to indicate to request and fetch the entire cache line (ECL) from memory. In an embodiment the cache line indicator field does not need to be set or marked, and the system can be configured by default to request the entire cache line (ECL) if the fractional line field is not set. After 840, the method 800 continues to block 850 described below.

If it is determined, based for example upon information from the CUT Table, that the load instruction (ITag) previously used only a portion of the cache line (PCL) (835: Yes), then, at 845, the load instruction cache line indicator field 795 is set or marked, for example with a one, to indicate to fetch only a portion or fraction of the cache line (PCL). In an example, the IFU indicates to the LSU and/or memory controller to mark or set, and in an aspect the LSU and/or memory controller marks or sets, the cache line indicator field 795 in the load instruction (ITag) 790 with one or more bits to indicate to request and fetch only part of the cache line (PCL) from memory, and in an embodiment how much and the portion of the cache line to fetch. At 850, the memory controller requests the data from memory, and at 855, memory responds by sending the data, e.g., the PCL or ECL, over the link (e.g., link 560) between memory and the processor to the data cache (e.g., L1 cache, L2 cache, and/or L3 cache). In the example, where only a fractional or partial cache line (PCL) is requested and memory responds by sending only a fractional cache line (PCL), memory bandwidth is preserved. That is, less bandwidth is consumed sending the fractional or partial cache line (PCL) over the link between the processor and the memory subsystem.

While method 800 indicates at 810 checking to determine whether the data is in the data cache, and if not continuing to 820 where the Cut Table is checked to determine whether the load instruction is in the CUT Table and continuing through 845 where the ITag is marked under different scenarios to request and/or fetch the entire or partial cache line. It will be appreciated, as discussed above in connection with FIGS. 5-6, that checking the data cache for the load instruction can occur after the CUT Table is checked and the load instruction marked to indicate whether to request a partial or full cache line.

At 860, the data cache is checked to determine if the data responsive to the load instruction (ITag) is in the data cache. If the data is in the data cache (860: Yes), then at 865, similar to 815, the data corresponding to the load instruction (ITag) is sent to the LSU. After 865 the method 800 continues to 885 described below. If the data is still not in the data cache (860: No), for example because only a portion of the cache line, e.g., a partial cache line (PCL), was requested, then at 870 the load instruction (ITag) is set, updated, or marked to indicate to request an entire cache line (ECL) from memory. In an example, one or more bits in the cache line indicator field 795 is set or marked to indicate, request and/or fetch an entire cache line (ECL) from memory, and in an aspect, the fractional line field is set to zero or enters a default mode where the entire cache line (ECL) is requested. At 875 the entire cache line (ECL) is requested from memory, preferably by the memory controller. At 880 the entire cache line (ECL) is sent by the memory subsystem to the processor over the memory link, e.g., link 560, between the processor and the memory subsystem. The process 800 continues after 880 back to 860. After the data is sent to the LSU, and the load instruction (ITag) is executed, the load instruction (ITag) is marked complete or retires. After the load instruction (ITag) is executed, completes, and/or retires, at 885, the CUT table instruction is updated to include the executed, competed, and/or retired load instruction, and the bits in the utility field are set or updated to correspond to the data that was used, required, and/or needed in the cache line associated with the load instruction (lTag). In an embodiment, if the full cache line (ECL), or if only a portion of the cache line (PCL) was used, required, and/or needed by that load instruction, then the utility field bits are set accordingly. In an embodiment where only a portion of the cache line was used, needed, or required, the bits in the utility field are set to indicate what portion and how much of the cache line was used by the processor.

The techniques, system, and methods described above would also have application in an example in a processor that uses instruction address based prefetching (or address prediction, where the prefetcher would also read the CUT table when generating a prefetch. The prefetcher will track the instruction address associated with a given stream and use the instruction address to look up in the CUT Table whether to fetch a partial cache line or an entire cache line. Because the prefetcher is speculative, the prefetcher will not update the Cut table.

A processor, system, and product are disclosed that in one or more embodiments includes: a memory controller having circuitry and logic to manages load instructions; a data cache having circuitry and logic to hold data for use by the processor; a load store unit having circuitry and logic to execute load instructions; an instruction fetch unit having circuitry and logic to fetch instructions for the processor, including load instructions; and a cache line utility tracker (CUT) table having circuitry and logic, the CUT table having a plurality of entries, each entry having a tag field to identify a load instruction and a utility field to indicate the portions of a cache line of a corresponding load instruction that were used by the processor. The processor, system, and product in one or more aspects includes a computer readable storage medium having program instructions embedded therein the program instructions executable by the processor. In one or more embodiments, the processor is configured to; and/or the instructions executable by the processor cause the processor to: check the data cache on the processor to determine whether the data corresponding to a load instruction being processed by the processor is in the data cache; in response to the data corresponding to the load instruction not being in the data cache, check the CUT Table to determine whether the load instruction is in an entry in the CUT Table; in response to the load instruction being in an entry in the CUT Table, determine from the information in the entry in the CUT Table corresponding to the load instruction whether or not to request a partial cache line from the memory subsystem; in response to determining to request a partial cache line, transmit from the processor to the memory subsystem a memory access request that only requests a partial cache line from the memory subsystem; and receive, in response to the memory access request, the partial cache line into the data cache on the processor over the link between the memory subsystem and the processor.

In the preceding, reference is made to embodiments presented in this disclosure. However, the scope of the present disclosure is not limited to specific described embodiments. Instead, any combination of the following features and elements, whether related to different embodiments or not, is contemplated to implement and practice various embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method of processing data in an information handling system, comprising:
    providing a load instruction in a processor;
    checking a cache line utility tracker (CUT) Table to determine the load instruction is in an entry in the CUT Table, wherein the CUT Table tracks historical usage of data cache lines per load instruction;
    in response to determining that the load instruction is in an entry in the CUT Table, determining from the information in the entry in the CUT Table corresponding to the load instruction to request a partial cache line from a memory subsystem;
    checking a data cache on the processor to determine whether the data corresponding to the load instruction is in the data cache;
    in response to determining to request a partial cache line from the memory subsystem, and further in response to determining that the data corresponding to the load instruction is not in the data cache, transmitting from the processor to the memory subsystem a memory access request that only requests a partial cache line from the memory subsystem; and
    receiving, in response to the memory access request, the partial cache line into the data cache on the processor over a link between the memory subsystem and the processor.

2. The method according to claim 1, further comprising:
    in response to receiving the partial cache line into the data cache on the processor, sending the partial cache line in the data cache onto a load store unit; and
    in response to the load instruction completing, updating the CUT table to indicate that the load instruction used only a partial cache line.

3. The method according to claim 1, further comprising in response to determining to request a partial cache line, marking the load instruction with one or more bits as an indicator to request the partial cache line.

4. The method according to claim 1, further comprising:
    determining, from information in the entry in the CUT Table corresponding to the load instruction, to request an entire cache line;
    in response to determining to request an entire cache line, and further in response to determining that the data corresponding to the load instruction is not in the data cache, transmitting from the processor to the memory subsystem a memory access request that requests an entire cache line from the memory subsystem; and
    receiving, in response to the memory access request, the entire cache line into the data cache on the processor over a link between the memory subsystem and the processor.

5. The method according to claim 4, further comprising in response to determining to request an entire partial cache line, performing at least one of a group to request the entire cache line, the group consisting of marking a load instruction with one or more bits as an indicator and entering a default mode.

6. The method according to claim 4, further comprising:
receiving the entire cache line into the data cache on the processor,
sending the entire cache line onto a load store unit; and
in response to the load instruction completing, updating the CUT table to indicate that the load instruction used an entire cache line.

7. The method according to claim 1, further comprising:
checking the data cache on the processor to determine the data corresponding to the load instruction is in the data cache;
in response to determining that the data corresponding to the load instruction is in the data cache, sending the data corresponding to the load instruction to a load store unit; and
in response to the load instruction completing, updating the CUT Table to indicate one or more portions of the cache line that were utilized.

8. The method of claim 1, wherein determining from the information in the entry in the CUT Table corresponding to the load instruction to request a partial cache line from the memory subsystem comprises reading a utility field from the CUT Table to determine at least one of a group was used previously by the load instruction, wherein the group consisting of an entire cache line, nearly an entire cache line, and a portion of a cache line.

9. The method of claim 1, further comprising:
checking the CUT Table to determine the load instruction is not in an entry in the CUT Table; and
in response to determining that the load instruction is not in the CUT Table, and further in response to determining the data corresponding to the load instruction is not in the data cache, transmitting by the processor to the memory subsystem a memory access request that requests an entire cache line from the memory subsystem.

10. The method of claim 9, wherein:
in response to (a) determining the load instruction is not in the CUT Table, (b) determining the data corresponding to the load instruction is not in the data cache, and (c) requesting an entire cache line from the memory subsystem, receiving, in response to the memory access request, the entire cache line into the data cache on the processor;
sending the entire cache line from the data cache to a load store unit; and
in response to the load instruction completing, updating the CUT table to indicate one or more portions of the cache line used by the processor.

11. An information handling system, comprising:
a memory subsystem;
a processor; and
a link connecting the processor and memory subsystem, the processor comprising:
a memory controller having circuitry and logic to manage load instructions;
a data cache having circuitry and logic to hold data for use by the processor;
a load store unit having circuitry and logic to execute load instructions;
an instruction fetch unit having circuitry and logic to fetch instructions for the processor, including load instructions; and
a cache line utility tracker (CUT) table having circuitry and logic to track historical usage of data cache lines per load instruction, the CUT Table having a plurality of entries, each entry having a tag field to identify a load instruction and a utility field to indicate the portions of a cache line of the load instruction that were used by the processor,
wherein the system is configured to:
check the CUT Table to determine the load instruction is in an entry in the CUT Table;
in response to determining that the load instruction is in an entry in the CUT Table, determine from the information in the entry in the CUT Table corresponding to the load instruction to request a partial cache line from the memory subsystem;
check the data cache on the processor to determine the data corresponding to a load instruction being processed by the processor is not in the data cache;
in response to determining to request a partial cache line from the memory subsystem, and further in response to determining the data corresponding to the load instruction is not in the data cache, transmit from the processor to the memory subsystem a memory access request that only requests a partial cache line from the memory subsystem; and
receive, in response to the memory access request, the partial cache line into the data cache on the processor over the link between the memory subsystem and the processor.

12. The system of claim 11, wherein the system is further configured to:
in response to receiving the partial cache line into the data cache on the processor, send the partial cache line in the data cache onto the load store unit; and
in response to the load instruction completing, update the CUT table to indicate that the load instruction used only a partial cache line.

13. The system of claim 11, wherein the system is further configured to:
in response to determining to request a partial cache line, mark the load instruction with one or more bits as an indicator to request the partial cache line.

14. The system of claim 11, wherein the system is further configured to:
determine, from information in the entry in the CUT Table, to request an entire cache line;
in response to determining to request an entire cache line, and further in response to determining that the data corresponding to the load instruction is not in the data cache, transmit from the processor to the memory subsystem a memory access request that requests an entire cache line from the memory subsystem; and
receive, in response to the memory access request, the entire cache line into the data cache on the processor over a link between the memory subsystem and the processor.

15. The system of claim 14, wherein the system is further configured to:
in response to determining to request an entire cache line, perform at least one of a group to request an entire cache line, the group consisting of marking a load instruction with one or more bits as an indicator and entering a default mode.

16. The system of claim 14, wherein the system is further configured to:
  receive the entire cache line into the data cache on the processor,
  send the entire cache line onto the load store unit; and
  in response to the load instruction completing, update the CUT table to indicate that the load instruction used an entire cache line.

17. The system of claim 11, wherein the system is further configured to:
  check the data cache to determine the data corresponding to the load instruction is in the data cache;
  in response to the data corresponding to the load instruction being in the data cache, send the data corresponding to the load instruction to a load store unit; and
  in response to the load instruction completing, update the CUT Table to indicate one or more of the portions of the cache line that were utilized.

18. The system of claim 11, wherein determining from the information in the entry in the CUT Table corresponding to the load instruction to request a partial cache line from the memory subsystem comprises the system configured to:
  read the utility field from the CUT Table to determine the extent to which a cache line was used previously by the load instruction.

19. The system of claim 11, wherein the system is further configured to:
  check the CUT Table to determine the load instruction is not in an entry in the CUT Table;
  in response to determining that the load instruction is not in the CUT Table, and further in response to determining that the data corresponding to the load instruction is not in the data cache, transmit by the processor to the memory subsystem a memory access request that requests an entire cache line from the memory subsystem.

20. The system of claim 19, wherein the system is further configured to:
  in response to (a) determining the load instruction is not in the CUT Table, (b) determining the data corresponding to the load instruction is not in the data cache, and (c) requesting an entire cache line from the memory subsystem, receive, in response to the memory access request, the entire cache line into the data cache on the processor;
  send the entire cache line from the data cache to the load store unit; and
  in response to the load instruction completing, update the CUT table to indicate one or more portions of the cache line that were used by the processor.

* * * * *